United States Patent Office 3,124,978
Patented Mar. 17, 1964

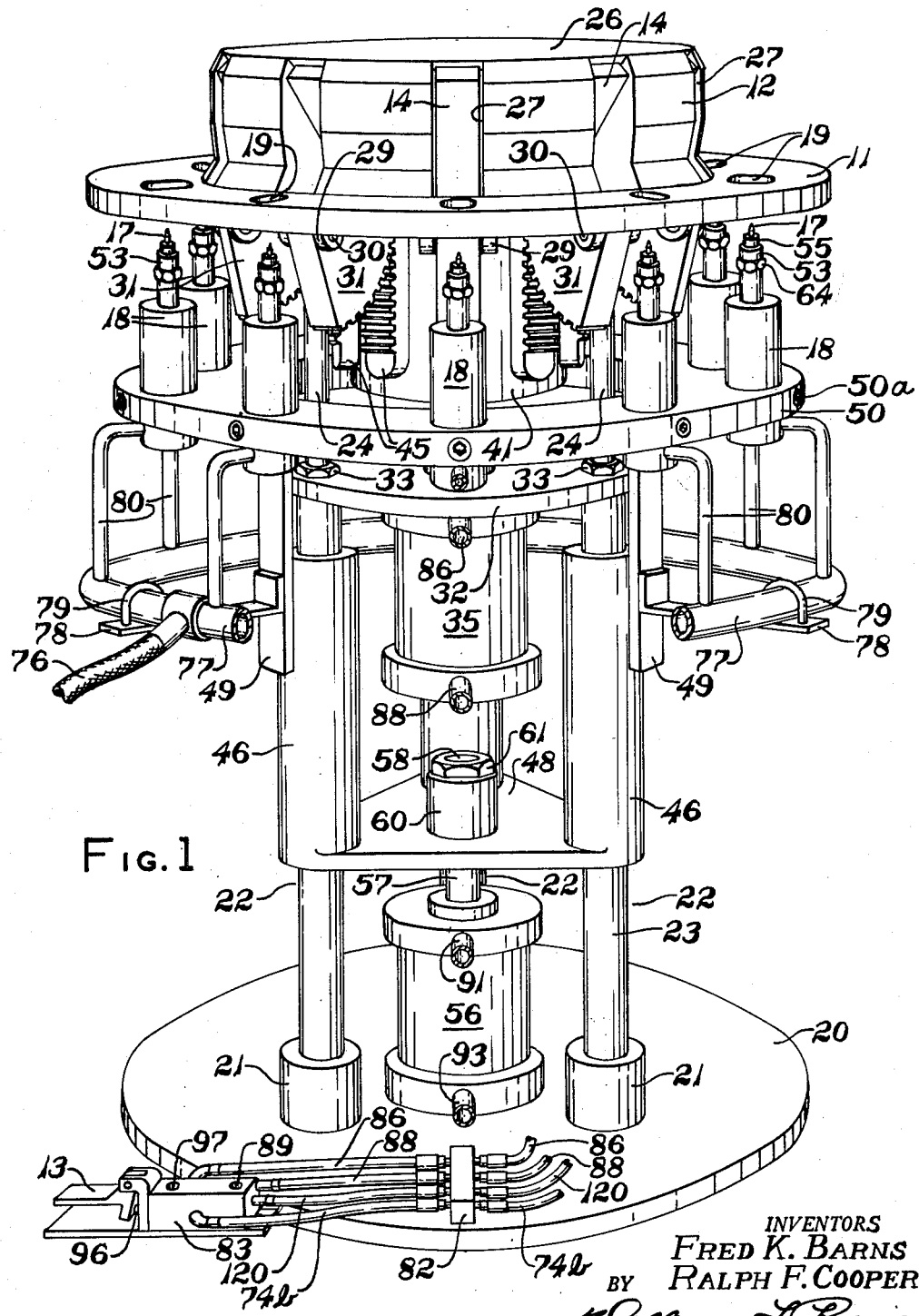

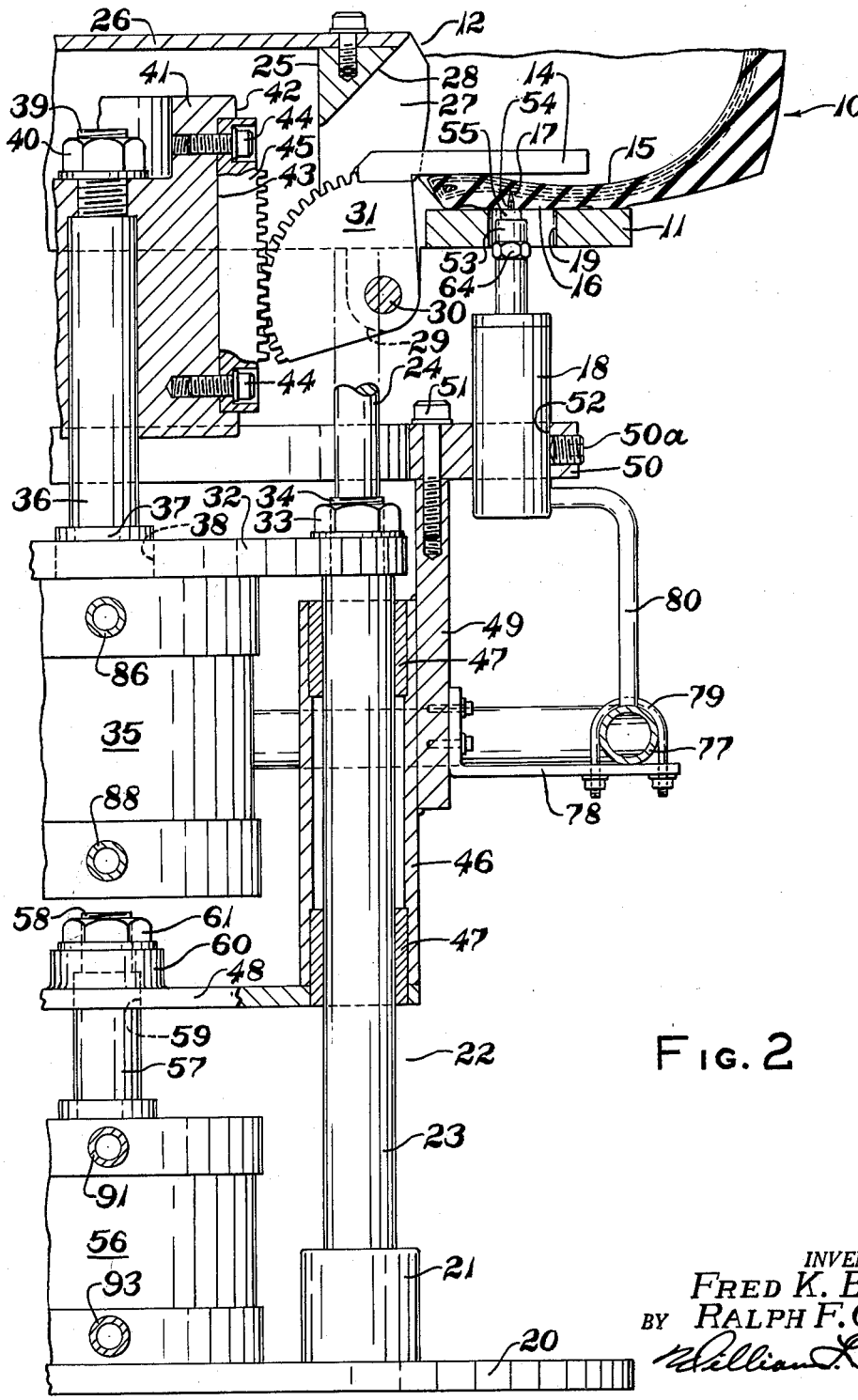

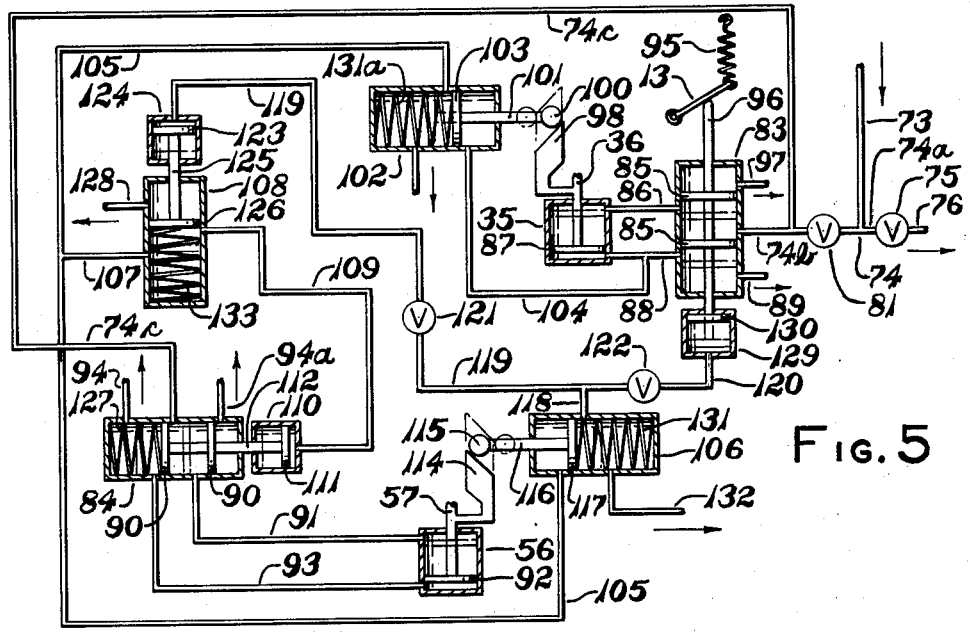
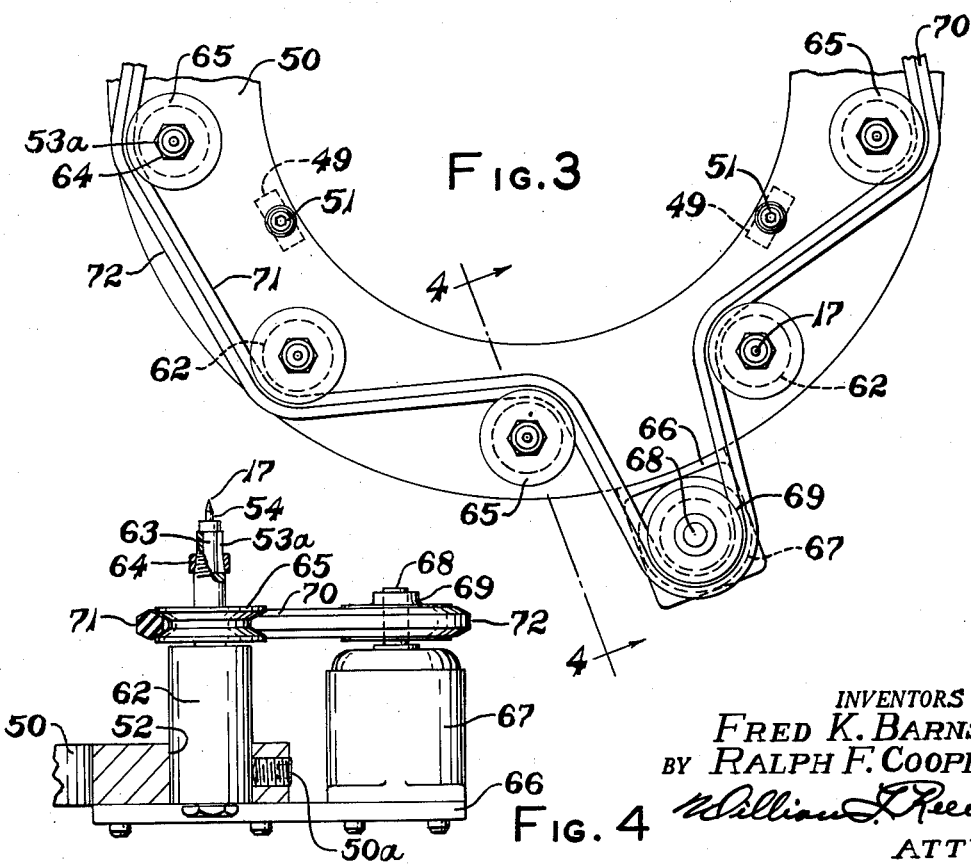

3,124,978
TIRE PIERCING APPARATUS
Fred K. Barns and Ralph F. Cooper, Akron, Ohio, assignors to The B. F. Goodrich Company, New York, N.Y., a corporation of New York
Filed May 1, 1961, Ser. No. 106,747
14 Claims. (Cl. 77—23)

This invention pertains to an apparatus for permitting the escape of gases trapped within the carcass of multiple ply elastometric articles during their manufacture, and more particularly, to an apparatus for piercing the sidewall of a vulcanized rubber vehicle tire to a predetermined depth to allow the escape of air or adhesive solvent vapors trapped between adjacent plies of rubber and rubberized cord fabric during tire building operations.

In the manufacture of vehicle tires, particularly those which are mass produced for passenger vehicle use, the problem of air or adhesive solvent vapor entrapment within the tire carcass poses a major problem. Any such gas, although originally confined in a relatively small pocket, will tend to expand due to heat buildup during high speed tire operation with resultant destructive ply separation and possible total failure of the tire.

Many expedients have been utilized in the past in attempts to facilitate escape of such gases, both during and following fabrication of the tire. Thus, during fabrication, pricked elastomeric cord fabric has been used to provide passages for the gases, and gas removal was also attempted by progressively stitching the plies from the central region of the carcass toward the beads to squeeze or "milk" the gases toward the edges of the plies. While the use of these media of gas removal are partially effective, sufficient gas frequently remains to cause an excessive number of tire defects. This is due, in part, to the fact that the pricked holes in the unvulcanized rubberized cord fabric are easily smeared over and closed during handling of the fabric, while the stitching rolls are not always applied with sufficient pressure to effectively "milk out" the gases. In addition to these expedients it therefore became necessary to pierce the sidewalls of the vulcanized tire to provide passages for any pockets of gas remaining in the tire or developed during curing or operation thereof. Hand piercing with an awl has been employed for this purpose but is generally unsatisfactory because of the time consuming nature of the operation, the difficulty in backing up the tire sidewall to prevent its deflection under the awling forces, and lack of the operator's control over the depth of penetration of the awl.

The principal object of this invention is, therefore, to provide an apparatus wherein a multiple ply annular elastomeric article, such as a pneumatic tire, may be rapidly and accurately pierced to a predetermined depth less than complete piercing of the tire body to permit escape of gases trapped within the carcass of the article during fabrication.

Another object of this invention is to provide an apparatus for simultaneously piercing a portion of the sidewall of a rubber tire to a predetermined depth, less than complete piercing of the sidewall, at a plurality of spaced locations which apparatus includes means to forcibly grip the sidewall of the tire during the piercing.

It is a further object of this invention to provide an apparatus for piercing a portion of the sidewall of a rubber tire to a predetermined depth wherein means are provided to forcibly grip the sidewall of the tire and a plurality of piercing members are mounted for movement through openings in a portion of said gripping means to said depth in the sidewall of said tire.

It is a still further object of this invention to provide an apparatus for piercing a portion of a sidewall of a rubber tire to a predetermined depth, wherein means are provided to support and locate a tire on said apparatus, a plurality of clamps are mounted thereon to forcibly grip the said sidewall, and a plurality of rotatable piercing members are mounted for movement through openings in said support, in response to the gripping of said sidewall, to penetrate said sidewall.

Further objects and advantages of the invention will be apparent from the following detailed description of the presently preferred embodiment thereof in the apparatus illustrated in the accompanying drawings, forming a part of this application, in which:

FIG. 1 is a perspective view of the apparatus with portions cut away and with the sidewall clamps shown in their retracted positions;

FIG. 2 is a fragmentary enlarged view of the apparatus, partially in section and partially in front elevation, more clearly showing the clamp actuating mechanism;

FIG. 3 is a fragmentary top plan view of an alternate mechanism for rotating the piercing members;

FIG. 4 is a fragmentary view, partially in section and partially in side elevation, taken along line 4—4 of FIG. 3; and FIG. 5 is a schematic diagram of the pneumatic control circuit for the apparatus.

*General Description*

The illustrated apparatus embodying the invention operates semi-automatically to vent a tire sidewall by piercing it to be a predetermined depth, less than complete piercing of the sidewall, simultaneously at a plurality of spaced locations. This is effected by placing a vulcanized tire 10 onto a horizontal tire support platform 11, with the tire being located thereon by means of a tire locator 12 which loosely engages the tire through its central opening. The operator then depresses a pedal 13 which actuates fluid pressure operated mechanisms causing clamp members 14, normally retracted within the tire locater 12, to engage the inner wall 15 of the tire sidewall 16 (see FIG. 2) and hold it firmly against the support platform 11. As this is accomplished, a plurality of sidewall perforating or piercing members 17, each rotated at high speed, by means of an individual air motor 18, as shown in FIGS. 2 and 3, or by means of a common drive belt as shown in FIGS. 3 and 4, are moved to and from penetrating contact with the sidewall 16 of the tire 10 through openings 19 in the support platform 11. After the piercing members 17 are withdrawn from the tire sidewall 16, the clamp members 14 disengage the tire sidewall 16 and the tire 10 may be lifted from the apparatus.

*Structural Description*

The illustrated apparatus rests upon a horizontal base plate 20 having three equi-spaced post feet 21 mounted thereon. Rigidly mounted in each foot 21 is a vertical support post 22 having a smooth cylindrical lower portion 23, a short intermediate threaded portion 34 and an upper portion 24 which is of reduced diameter. On the upper ends of the portions 24 an annular tire locater 12 is mounted. The locater 12 has a central opening 25 that is normally covered by a removable circular plate 26 which may be removed to secure access to the interior of the apparatus. The locater 12 also has a plurality of radial slots 27 which communicate its periphery with its central opening 25. Each slot 27 has an inclined roof portion 28, see FIG. 3. Mounted at the base of the locater 12 and extending radially outwardly therefrom is the tire support platform 11 having a plurality of parallel vertical passageways 19 which are in radial alignment with the slots 27 in the locater 12. To either side of each slot 27 and depending from the underside of the locater 12 is a pivot bracket 29. A horizontal pivot rod 30 is mounted between the adjacent brackets 29 at each slot 27. Pivotally mounted on each rod 30 is a segment of a spur gear 31, having a clamp member 14 tangentially mounted thereto for movement from within the slot 27 to and from gripping engagement with the sidewall 16 of a tire 10 supported by the support platform 11, as the gear 31 is pivoted.

A horizontal platform 32 is mounted on the upper ends of the smooth cylindrical portions 23 of the vertical posts 22 and is held thereto by means of nuts 33 engaged with the threaded post portions 34. Depending from and mounted on the underside of the platform 32 is a double-acting air cylinder 35 having a piston rod 36 extending through a bearing sleeve 37 which is mounted in a central opening 38 of the platform 32. The piston rod 36 has a threaded portion 39 of reduced diameter at its upper end. Mounted coaxially on the piston rod 36, and held thereto by means of a nut 40 engaged with the threaded portion 39, is an annular rack gear holder 41. In the outer cylindrical face 42 of the holder 41 are formed a plurality of recesses 43 extending longitudinally parallel to the axis of the piston rod 36 and equal in number to the number of slots 27. Mounted in each recess 43 by means of bolts 44 is a radially projecting gear rack 45 engaged with one of the spur gear segments 31. The parts are so arranged that when the piston rod 36 is in its extended position, as seen in FIG. 2, the clamping members 14 are in their tire sidewall clamping position; and when the piston rod 36 is retracted, the clamping members 14 are moved upwards against the inclined roofs 28 of the tire locater slots 27, as seen in FIG. 1.

A support sleeve 46 is slideably mounted on each of the smooth cylindrical portions 23 of the vertical support posts 22 by means of a pair of bearing sleeves 47. Mounted between the sleeves 46 is a horizontal actuating bracket 48 of generally triangular shape. Welded to the outer side of each support sleeve 46 is a vertical support bar 49. A horizontal ring member 50 is mounted on the upper ends of the support bars 49 by means of bolts 51. Vertically mounted in openings 52 in the ring member 50 and held therein by means of set screws 50a are a plurality of air motors 18 equal in number to, and coaxially aligned with, the openings 19 in the support platform 11. The air motors are standard commercially available items, the details of which form no part of the invention, and will therefore not be described, it being sufficient here to note that each air motor 18 has a rotatable shaft provided with a chuck 53. Each chuck 53 has a piercing member 17 removably held thereby. These members 17 each have a tire penetrating shank portion 54, the diameter of which is preferably in the order of 1/16 inch with the upper end of the shank portion 54 tapered over a distance in the order of 5/64 inch, to a point. Each member 17 also has a shoulder portion 55 spaced a distance from the point equal to the desired depth of tire penetration. The members 17 may be made in one piece or, if desired, the shank and pointed portion may be formed as a separate element removably clamped in a larger diameter rod providing the aforementioned shoulder 55. During operation, the members 17 are axially rotated by their air motors 18 at a speed which is preferably in the order of 1200 r.p.m.

Mounted on the base plate 20 is a double acting air cylinder 56 having a vertically extending piston rod 57. Piston rod 57 has a stepped down threaded portion 58 which passes through an opening 59 in bracket 48 and a retaining collar 60 mounted on the upper surface of bracket 48, and is held thereto by means of a nut 61 engaged with the threaded portion 58. Thus, as the piston rod 57 moves alternately up and down, the piercing members 17 are caused to move, respectively, to and from penetrating contact with the tire 10.

FIGURES 3 and 4 illustrate an alternate embodiment for rotating the members 17. In this embodiment the air motors are removed, and mounted in each of the openings 52 of the ring member 50 and held therein by means of set screws 50a is a bearing sleeve 62 in which a chuck 53a, identical to those used with the air motors 18, is rotatably mounted. A shank portion 63 of a member 17 is seated in each chuck 53a and is gripped therein by tightening of a chuck nut 64. Coaxially mounted on each chuck 53a is a belt sheave 65. Mounted outwardly of ring member 50, by means of a motor bracket 66 which is bolted to the underside of member 50, is a drive motor 67 having its drive shaft 68 extending vertically parallel to the chucks 53a. Mounted on drive shaft 68 in the driving plane of the belt sheaves 65 is a drive sheave 69. Passing about a portion of all of the sheaves 65 and 69 is a flexible drive belt 70 having a hexagonal cross-section, as seen in FIG. 4. Thus, the belt 70 may transmit driving power by either its inner surface 71, or its outer surface 72.

*Pneumatic Controls*

Air under elevated pressure is supplied to the apparatus by means of a feed line 73, see FIG. 5. The feed line is divided at 74 with a portion of the air being sent through line 74a and manifold shutoff valve 75. Line 74a is connected by means of a flexible hose 76 to a circular manifold 77 mounted about the apparatus by means of support brackets 78, which are mounted on vertical support bars 49 and are provided with U clamps 79 that embrace the manifold. The manifold 77 is connected to the air motors 18 by means of individual feed lines 80.

Another portion of the air feed is diverted through air shutoff valve 81 in line 74b through an air distributor block 82, seen only in FIG. 1, to a four-way valve 83 which is initially actuated by means of the operator's pedal 13. Air is also diverted from line 74b through line 74c to a four-way, spring return valve 84.

The pneumatic control circuit will be readily understood from the following detailed operating description of the apparatus taken as a whole.

*Operation Description*

In operating the apparatus the operator first opens shutoff valve 75 which causes the members 17 to rotate at a high rate of speed. He then opens shut off valve 81 allowing air to flow through line 74b to the four-way valve 83 and through line 74c to four-way valve 84. Valve 83, with the position of its pistons 85 as shown in full line, allows air to pass through line 86 to the upper side of a piston 87 in the double-acting air cylinder 35 to hold it in its lowered position as shown in full line. Any air beneath piston 87 is exhausted through line 88 and valve 83 to exhaust line 89. Valve 84, with its pistons 90 in their position as shown in full line, allows air to pass through line 91 to the upper side of the piston 92 of double-acting air cylinder 56, holding said piston 92 in its lowered position as shown in full line. Any air beneath piston 92 is exhausted through line 93 and valve 84 to exhaust line 94. Hence, the clamp members 14 are elevated and the piercing members 17 are in their lowermost positions.

At this time the operator places a tire 10 on supoprt platform 11, the tire being located thereon by means of the locater 12 which loosely engages the central opening of the tire. The operator then momentarily depresses pedal 13, which is held in a normally raised position by means of a spring 95. The pedal acts upon the piston rod 96 of the valve 83 moving it and the pistons 85 to their dotted line postions. Air is then directed from line 74b through valve 83 and line 88 to the lower side of the piston 87 of air cylinder 35, and air is exhausted from the upper side of the piston 87 through line 86 and valve 83 to exhaust line 97. This causes piston 87 to move to its dotted line position. A cam 98, seen only in FIG. 5, mounted on the piston rod 36 of cylinder 35 acts upon a cam follower 100 mounted on the outer end of a piston rod 101 of a three-way, normally closed, spring return valve 102 to move the rod 101 and a piston 103 mounted thereon to their dotted line positions. Air from line 88 then passes through line 104 and is directed by valve 102 through line 105 to another three-way, normally closed, spring return valve 106.

As piston rod 36 moves upward it moves the gear racks 45, attached thereto, upward to pivot the segmental spur gears 31 engaged with said gear racks 45. Pivotal movement of the segmental gears 31 causes the clamping fingers 14 mounted thereon to move radially outward from the slots 27 in the locater 12 and downward to clamp the sidewall 16 of the tire 10 against the support platform 11.

A portion of the air passing through line 105 is taken off through line 107 through a normally open, three-way, spring return valve 108 and pilot air line 109 to a single acting, valve pilot, air cylinder 110. The piston 111 of cylinder 110 is mounted on one end of a piston rod 112 which is also attached to the pistons 90 of the four-way valve 84. As air from pilot line 109 forces piston 111 to its dotted line position, pistons 90 are also moved to their dotted line positions causing air from line 74c to be directed through line 93 to the underside of the piston 92 of air cylinder 56. Piston 92 is thus moved upward to its dotted line position, air from the upper side of piston 92 being exhausted through line 91 and valve 84 to exhaust line 94a. As piston 92 moves upward it moves its piston rod 57, which carries the ring member 50 and the rotating piercing members 17, upward. The members 17 and a portion of their chucks 53 pass upwards through the openings 19 in the support 11 with the members 17 entering the tire sidewall to the depth determined by the shoulders 55.

As piston rod 57 moves upward a cam 114 mounted thereon, seen only in FIG. 5, engages a cam follower 115 mounted on one end of the piston rod 116 of the three-way valve 106, moving piston 117 of valve 106 to its dotted line position. Air from line 105 is thus directed through line 118 to pilot air lines 119 and 120. A control valve 121 located in line 119 allows unrestricted full flow of air in a direction away from valve 106 while restrictively controlling air flow in the opposite direction. A similar valve 122 located in line 120 restricts the flow of air in line 120 away from valve 106 while allowing full flow in the opposite direction. As air flows through pilot air line 119 it forces a piston 123 in a pilot cylinder 124 to its position as shown in dotted line. Piston 123 is mounted at one end of a piston rod 125 connected to piston 126 within the three-way valve 108. Thus, piston 126 is moved to its dotted line position closing valve 108 to discontinue the flow of air in air line 107 and pilot air line 109, and allowing pilot cylinder piston 111 and valve pistons 90 of the four-way valve 84 to be returned to their positions as shown in full line by the force of valve return spring 127, the air in cylinder 110 being exhausted through line 109 and three-way valve 108 to exhaust line 128.

By returning the pistons 90 of four-way valve 84 to their original position shown in full line, air flow in lines 91 and 93 is reversed to lower the piston 92 of the double acting air cylinder 56 and thereby move the piercing members 17 away from piercing engagement with the tire 10.

During this same time air is flowing through valve 122 to the pilot cylinder 129 of four-way valve 83, causing the pilot piston 130 to move to its position shown in full line. Piston 130 is mounted at one end of piston rod 96 of the four-way valve 83 so that as piston 130 returns to its original starting position it returns the pistons 85 to their original positions.

As the piercing members 17 and piston rod 57 move away from the tire 10 cam 114 disengages cam follower 115, allowing the piston 117 of three-way valve 106 to be returned to its original position, shown in full line, under the force of piston return spring 131. Thus, air cylinder 129 is vented through line 120, valve 122, line 118 and valve 106 to exhaust line 132 in readiness for the next depression of pedal 13 by the operator.

As four-way valve 83 is returned to its original condition air flow in lines 86 and 88 is reversed to lower the piston 87 of cylinder 35 and thereby retract the tire clamping fingers 14 from the tire 10. Cam 98 on piston rod 36 disengages the cam follower 100 of three-way valve 102 allowing the piston 103 to be returned to its position shown in full line under the force of a piston return spring 131.

Valve piston 126 and pilot piston 123 of three-way valve 108 are returned to their positions in full line under the force of piston return spring 133, air in pilot cylinder 124 being exhausted through line 119 and valve 106 to exhaust line 132.

The pneumatic control circuit for the apparatus has now been automatically returned to its original starting condition and the operator may remove the pierced tire.

The pneumatic control circuit is designed such that after the operator momentarily depresses pedal 13 the apparatus will automatically complete its operating cycle, freeing the operator for other duties. However, it will be appreciated that repeated movement of the piercing members 17 to and from penetrating contact with a tire sidewall 16, without release of the tire clamping members, may be effected when desired by keeping the pedal 13 depressed.

Although the invention has been defined with reference to one specific embodiment, and a modification of a part thereof, it will be understood by those skilled in the art to which it pertains that further modifications and refinements thereto may be made within the spirit and scope of the invention as defined in the appended claims.

We claim:

1. An apparatus to provide venting openings in a sidewall of a pneumatic tire comprising, a plurality of tire piercing members supported in a generally circular configuration, means to removably and substantially unyieldingly clamp said tire sidewall in concentric relationship to said members, means to effect relative axial movement between said clamped sidewall and said members to cause the latter to enter the former, and means to effect operation of said clamp means and the said means to effect relative axial movement in predetermined timed relationship.

2. An apparatus as defined in claim 1 wherein said piercing members comprise rigid elements each having a pointed end and an abutment spaced from said pointed end a predetermined distance to limit the depth of penetration of the elements into the tire sidewall.

3. An apparatus as defined in claim 2 wherein means are provided for rotating said elements each about its own axis as said relative axial movement is effected.

4. An apparatus to provide passageways for the escape of gaseous materials from within the body of a pneumatic tire comprising, tire centering means mounted on said apparatus for cooperation with the central opening of said tire to center said tire relative to a work performing axis of said apparatus, tire support means mounted on said tire centering means, means to clamp a sidewall of said tire against said support means, a plurality of tire piercing members movably mounted adjacent said support means, and means to move said members to and from penetrating contact with said clamped sidewall.

5. An apparatus to provide passageways for the escape of gaseous materials from within the body of a pneumatic tire comprising: a vertically extending, annular, tire centering projection for cooperation with the central opening of a tire; a flange member mounted about said projection; means to clamp a sidewall of said tire centered by said projection against said flange; a plurality of rotatable piercing members axially movably mounted adjacent said flange; and means to axially move said members to and from penetrating contact with said sidewall so clamped.

6. An apparatus to provide passageways for the escape of gaseous materials from within the carcass of a pneumatic tire comprising: an annular tire locater; support means mounted on said locater to support a sidewall of a tire located thereon by said locater, said support means having a plurality of vertically extending passageways formed therein; a plurality of sidewall clamps movable to and from clamping engagement with said sidewall so supported; means to so move said clamps; a plurality of rotatable tire piercing members movably mounted adjacent said support means; means to axially rotate said members at high speed; and means to axially move said members to and from penetrating engagement with said sidewall through said passageways.

7. An apparatus to provide passageways for the escape of gaseous materials from within the carcass of a pneumatic tire comprising, a tire locater, support means mounted on said locater to support a sidewall of a tire located thereon, a plurality of passageways formed in said support means, clamp means normally contained within said locater and extensible therefrom to clamp said sidewall against said support means in substantially unyieldable condition, a plurality of tire piercing members movably mounted adjacent said support means, means to rotate said members, and means to simultaneously move all of said members to and from penetrating engagement with the sidewall of a tire clamped against said support means.

8. An apparatus to provide passageways for the escape of gaseous materials from within the carcass of pneumatic tire comprising, slotted tire locater means for locating said tire on said apparatus by cooperation with the central opening of said tire, support means mounted on said locater means to support said tire located thereon, a plurality of passageways formed in said support means, clamping fingers pivotally mounted within said locater means for movement through the slots of said locater means to and from clamping engagement with a sidewall of said tire so supported, means to rock said fingers about their pivotal mountings, a plurality of rotatable tire piercing members axially movably mounted adjacent said support means, means to rotate said piercing members, and means to move said members axially through said passageways to and from penetrating contact with said clamped sidewall.

9. An apparatus to provide passageways for the escape of gaseous materials from within the carcass of a pneumatic tire comprising, an axially multi-slotted vertically extending tire locater adapted to be received in the central opening of a tire, a perforated horizontal tire support flange mounted on said locater, a plurality of tire clamping fingers each pivotally mounted within said locater for movement through a slot of said locater to and from clamping engagement with the sidewall of a tire located on said flange, a ring member axially movably mounted beneath said support flange, a plurality of tire penetrating means individually rotatably mounted on said ring member in alignment with a perforation of said support flange, means to rotate said penetrating means, and means to move said ring member toward and away from said support flange to thereby cause said penetrating means to enter the sidewall of the tire clamped on said flange.

10. An apparatus to provide passageways for the escape of gaseous materials from within the carcass of a rubber vehicle tire comprising, a base, a vertical support mounted on said base, a horizontal tire support flange mounted on said vertical support, a plurality of spaced vertical passageways formed in said flange, a radially slotted and vertically extending tire locater extending coaxially from the upper surface of said flange for reception in the central opening of a tire placed on said flange, a plurality of clamp fingers pivotally mounted on said flange for movement through a slot in said locater to and from clamping engagement with the inner wall of the sidewall of a tire located on said flange, a common means to simultaneously move said fingers to and from said clamping engagement, a ring member movably mounted coaxially of said flange beneath the latter, a plurality of tire sidewall piercing members rotatably mounted on said ring member each in axial alignment with one of said passageways, means to rotate said piercing members, and means to axially move said ring member toward and from said flange in timed relationship to the movement of said fingers to and from tire clamping engagement whereby a tire sidewall is clamped on and against said flange by said fingers and is pierced by said rotating piercing members.

11. An apparatus as defined in claim 10 wherein said means to rotate said piercing members comprises an individual motor for each piercing member mounted on said ring member.

12. An apparatus as defined in claim 10 wherein the said means to rotate said piercing members comprises a single motor mounted on said ring member and a common drive interconnecting said motor to all of said piercing members.

13. An apparatus as defined in claim 10 wherein each of said piercing members is supported in a chuck rotatably mounted on said ring member, a sheave is mounted on each chuck, a drive motor having a drive shaft is mounted on said ring member, a sheave is mounted on said drive shaft, and a drive belt interconnects and passes about all of said sheaves.

14. An apparatus to provide passageways for the escape of gaseous materials from within the carcass of a rubber vehicle tire comprising, a tire support member, a plurality of rockable members engageable with the sidewall of a tire supported by said support member, a plurality of tire piercing members movably mounted on said apparatus on the side of said support member opposite the side for contact with said tire, means to move said rockable members to and from said clamping engagement with said tire, and means responsive to the said clamping movement to move said piercing members to penetrating engagement with said supported and clamped time.

References Cited in the file of this patent
UNITED STATES PATENTS

| | | |
|---|---|---|
| 1,412,951 | Maxwell | Apr. 18, 1922 |
| 1,911,303 | Brown | May 30, 1933 |
| 2,220,404 | Hulslander | Nov. 5, 1940 |
| 2,369,828 | Humphreys | Feb. 20, 1945 |
| 2,561,012 | Clark | July 17, 1951 |
| 2,619,710 | Ovshinsky | Dec. 2, 1952 |
| 2,877,670 | Allen | Mar. 17, 1959 |
| 2,979,091 | Noall | Apr. 11, 1961 |